March 2, 1965   T. W. SPILHAUG   3,171,941
PROCESS AND APPARATUS FOR RESISTANCE WELDING OF METAL RODS
Filed Aug. 14, 1962
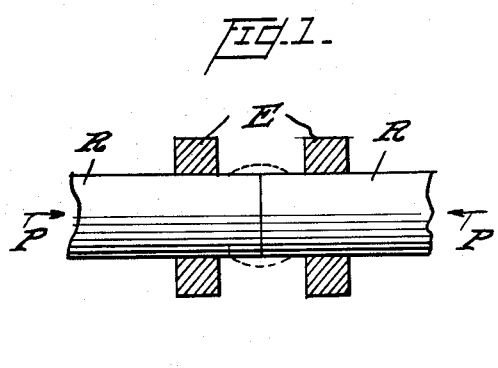
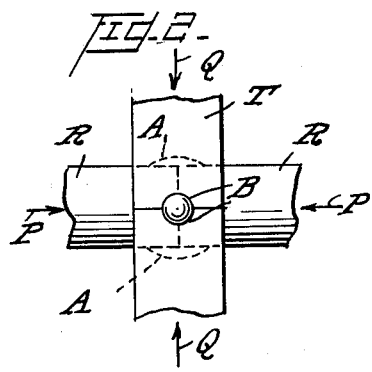
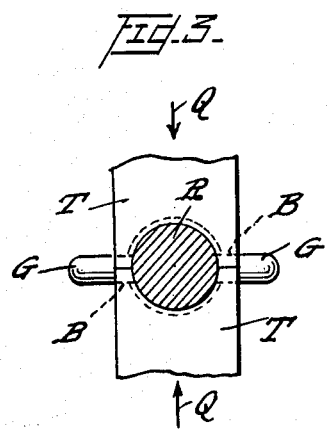
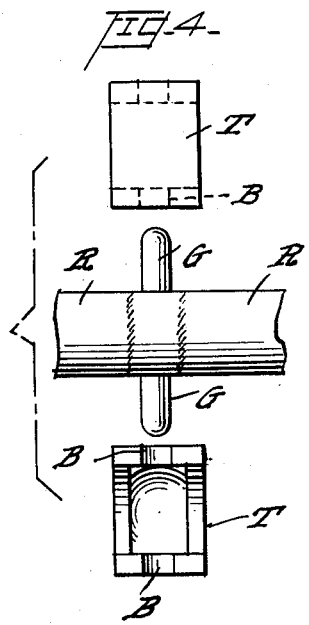
INVENTOR
Tor W. Spilhaug,
BY Watson, Cole, Grindle & Watson
ATTORNEYS 3,171,941
PROCESS AND APPARATUS FOR RESISTANCE
WELDING OF METAL RODS
Tor William Spilhaug, Helle, near Kragero, Norway
Filed Aug. 14, 1962, Ser. No. 216,908
2 Claims. (Cl. 219—57)

This application relates to apparatus and methods for welding of metal rods and more particularly to resistance welding of metal rods.

This application is a continuation-in-part application of my application Serial No. 848,367, filed October 23, 1959, now abandoned.

The present invention relates to a process for resistance welding of metal rods, in particular iron or steel rods, and also an apparatus for the performance of such process. One object of this invention is to simplify and improve the process and operations which up till now have been considered necessary for the performance of such welding. Another important object of the invention is to control, as far as practically possible the shape of burrs formed at the point of welding between the ends of the two rods to employ apparatus such that the burrs which nevertheless are formed, are given such a shape that any subsequent machining of the point of welding is facilitated.

Briefly, according to aspects of this invention, the metal rods to be welded together are forced against each other with an axial pressure of a value sufficient to cold deform the ends of the rods. Advantageously, the rods contain sufficient reducing material to reduce the oxide formed at the junction, which oxide is responsible for the formation of the burr. These oxidizers are contained in an amount sufficient to reduce the oxide film. After the rods are cold deformed, electric current is passed through the rods by means of attached electrodes to effect heating at the junction of the rods. The axial pressure is then sufficiently reduced to prevent compression of the heated weld. When the welding temperature is reached, the electrodes are removed and a pair of tools are advanced from opposite sides of the weld in a directional normal to the axes of the rods to enclose the weld. The tools are joined together to encircle the rods and extend on either side of the junction of the rods. The inner surfaces of the tools are so shaped as to either enclose the weld point completely or leave a certain limited space on opposite sides of the rods for the formation of a burr. The enclosing tools may be recessed at their joining faces and the recess will correspond to form a pair of oppositely extending passages which extend from the welding point to the outside of the tools. The pressure is now increased to such a value that the metal at the hottest point of the weld, that is the metal at the junction of the rods in the plane where the electric resistance is the greatest will flow outwardly through the passages. A burr is therefore formed with the same sectional shape as that of the corresponding passage.

Because of the very high pressure which closed the welding surfaces by cold deformation prior to the initiation of the heating, a very small amount of oxide is formed on the welding surfaces during the heating. The oxide actually formed is situated in the material zone which is hottest subsequent to the electrical heating step and prior to the ultimate compression step. This oxide is formed on the metal in the plane which exhibits the smallest resistance to deformation and the highest electrical resistance. Consequently, the portion of the burr which has been forced outwardly through the passage is the portion containing the most oxide. As a result, the weld has very little oxide contamination at the point between the rods. The enclosing tools are now opened and the burrs which remain at the junction of the rod are easily removed such as by cutting. In ordinary resistance welding the burrs formed are of substantially circular cross section. If an attempt is made to compress the circular weld, the burr is forced into the weld and the weld is weakened.

Accordingly, it is a feature of this invention to employ an initial heavy pressure which cold deforms the welding rods at their junction and greatly reduces the oxidation of the welding surfaces.

It is another feature of this invention to reduce the pressure after heating with a result that the outward flow of metal is reduced.

It is still a further feature of this invention to cause the ultimate outward flow of the remaining oxide with a predetermined simple profile, which oxide is readily removed such as by cutting.

These and various other objects and features of the invention will be more clearly understood from a reading of the detailed description of the drawing in which:

FIG. 1 is a view in elevation partly in section of the first step according to this invention;

FIGS. 2 and 3 are views in elevation taken at right angles to each other showing the next step in this novel method; and FIG. 4 is a plan view of rods with upper and lower tools moved to opposite sides.

Referring now to FIG. 1, there is depicted the first step according to this novel method of welding in which a pair of electrodes E are attached to a pair of rods R and axial pressure is applied to the rods as indicated by the arrows P until the rods are cold deformed as indicated by the dotted line at the junction of the two rods. After the rods are deformed, an electric current is passed through the electrodes E until the welding rods reach a welding temperature. The pressure in the direction indicated by the arrows and designated by legend P is then sufficiently reduced to prevent compression of the heated junction.

When the welding temperature is reached, the electrodes E are removed and a pair of tools T are advanced from opposite sides of the weld in a direction perpendicular to the axes of the weld rods and a force is applied to these tools T in a direction indicated by arrows Q, as best seen in FIGS. 2 and 3. The tools T are so shaped as to either enclose the weld junction completely or to leave a space as indicated by the dotted lines A.

Advantageously, the tools T are provided with recesses B in their abutting faces. These recesses cooperate to define a pair of oppositely extending passages through the tools from the weld junction to the exterior of the tool. The purpose of these passages will be subsequently explained.

After the tools T are placed in position, the pressure P is increased to such a value that the portions of the rod at their junction, i.e. the portion where the electric resistance is the greatest, will flow outwardly from the abutting surfaces through the passages B and form a pair of burrs G, best seen in FIG. 3.

Because of the very high pressure P employed to cold deform the weld rods prior to the initiation of heating, only a very small amount of oxide is formed on the welding surfaces during the heating. The oxide actually formed is situated in the material zone which is hottest subsequent to the electrical heating and prior to the ultimate compression and which exhibits the lowest resistance to deformation. Accordingly, it is this part of the metal which is forced outwardly through the passages B and forms the burrs G. The result of this method is a weld which is formed with a minimum of oxide contamination. As shown in FIG. 4, the tools T have been removed from the weld and the burrs G protrude from opposite sides of the welded rods. Because these burrs are concentrated in predetermined areas, they may be easily removed such as by cutting.

The above described method exhibits numerous advantages not present in the prior art methods of resistance welding. For example, in ordinary resistance welding the burrs which are formed are equally distributed about the periphery of the rods making the removal rather difficult. If an attempt is made to compress the deformed weld of the prior art, the only result is that the burr is forced into the weld and destroys the bond between the rods.

Another of the advantages in this novel process is that the high initial pressure which cold deforms the welding rods at the weld junction greatly reduces the oxidation of the welding surfaces. Further, because the pressure is reduced during heating, the outward flow of hot metal is reduced. Still further, the ultimate outward flow of the remaining oxides takes place in definite directions and with a predetermined simple profile, forming burrs which are easily removed such as by cutting.

While I have shown and described one illustrative embodiment of this invention, it is understood that the concepts thereof may be employed in other embodiments without departing from the spirit and scope of this invention.

What is claimed is:

1. A method of resistance welding of a pair of rods comprising the steps of placing the rods in abutting relationship, applying sufficient pressure to the rods along the axes of the rods to cold deform the rods, transmitting electricity through said rods to indicate heating at the junction of the rod, reducing the pressure as the rod becomes heated to prevent compression of the rods at the weld junction responsive to thermal expansion, continuing the transmission of current through the rods until a welding temperature is reached, removing the electrodes and advancing a pair of tools toward the rods to produce pressure at opposite sides of the rods and to completely enclose the welding junction and increasing the pressure applied along the axes of said rods to cause the metal at the weld junction to flow away from the rod axes.

2. The method according to claim 1, wherein the tools are provided with at least two cooperating recesses and wherein the step of increasing the pressure on said rods forces a portion of the weld through said recesses.

References Cited by the Examiner

UNITED STATES PATENTS

| | | | |
|---|---|---|---|
| 402,107 | 4/89 | Ries | 219—67 |
| 1,339,967 | 5/20 | Murray et al. | 219—105 |
| 2,066,647 | 1/37 | Rodman | 219—100 |

FOREIGN PATENTS

| | | |
|---|---|---|
| 1,028,385 | 4/58 | Germany. |

RICHARD M. WOOD, *Primary Examiner.*